US012569996B2

(12) United States Patent
Cho et al.

(10) Patent No.: US 12,569,996 B2
(45) Date of Patent: Mar. 10, 2026

(54) METHOD AND APPARATUS FOR AUTOMATICALLY GENERATING DRUM PLAY MOTION OF ROBOT

(71) Applicant: KOREA INSTITUTE OF SCIENCE AND TECHNOLOGY, Seoul (KR)

(72) Inventors: Jungsoo Cho, Seoul (KR); Sehyuk Yim, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 169 days.

(21) Appl. No.: 18/475,526

(22) Filed: Sep. 27, 2023

(65) Prior Publication Data

US 2025/0010468 A1 Jan. 9, 2025

(30) Foreign Application Priority Data

Jul. 3, 2023 (KR) ........................ 10-2023-0085947

(51) Int. Cl.
B25J 9/16 (2006.01)
B25J 11/00 (2006.01)

(52) U.S. Cl.
CPC ............. B25J 9/1664 (2013.01); B25J 9/163 (2013.01); B25J 9/1679 (2013.01); B25J 11/004 (2013.01)

(58) Field of Classification Search
CPC ........ B25J 9/1664; B25J 9/163; B25J 9/1679; B25J 11/004; B25J 9/1666
See application file for complete search history.

(56) References Cited

U.S. PATENT DOCUMENTS

| | | | | |
|---|---|---|---|---|
| 4,591,967 | A * | 5/1986 | Mattes ................. | G05B 19/052 |
| | | | | 710/110 |
| 10,814,483 | B2 * | 10/2020 | Kishi ...................... | G06T 13/40 |
| 11,527,223 | B2 * | 12/2022 | Liu .......................... | G10G 1/04 |
| 2002/0011145 | A1 * | 1/2002 | Aoki .................... | G10H 1/0025 |
| | | | | 84/609 |
| 2006/0185504 | A1 * | 8/2006 | Kobayashi ............. | G10H 7/002 |
| | | | | 84/645 |
| 2006/0259195 | A1 * | 11/2006 | Eliuk .................. | B01F 33/8442 |
| | | | | 700/245 |
| 2007/0157793 | A1 * | 7/2007 | Ischer .................... | G10D 13/14 |
| | | | | 84/411 M |
| 2009/0100979 | A1 * | 4/2009 | Furukawa ............ | G10H 1/0066 |
| | | | | 84/13 |
| 2009/0320672 | A1 * | 12/2009 | Rasker .................. | G10H 3/146 |
| | | | | 84/422.1 |
| 2010/0211200 | A1 * | 8/2010 | Kobayashi ............. | G10H 1/368 |
| | | | | 700/94 |

(Continued)

*Primary Examiner* — Sohana Tanju Khayer
(74) *Attorney, Agent, or Firm* — NSIP Law

(57) ABSTRACT

A method of generating a drum play motion of a robot includes generating a plurality of rhythms of a melody, assigning each of a plurality of notes forming a rhythm of each part to one of the right hand and the left hand of the robot, scheduling swing time of each of the right hand and the left hand to which each note is assigned, and generating a trajectory of each of a plurality of joints of the robot for playing the rhythm of each part based on the swing time of each of the right hand and the left hand, and by controlling a motion of each of the plurality of joints according to the trajectory of each of the plurality of joints generated in this way, creative drum play of a humanoid robot may be done when only a melody is input.

9 Claims, 8 Drawing Sheets

(56)          References Cited

U.S. PATENT DOCUMENTS

| | | | |
|---|---|---|---|
| 2010/0288102 A1* | 11/2010 | Fujiwara | G10F 1/02 |
| | | | 84/13 |
| 2014/0249673 A1* | 9/2014 | Lin | B25J 11/0035 |
| | | | 700/246 |
| 2016/0311112 A1* | 10/2016 | Gustafsson | B25J 9/1656 |
| 2018/0326588 A1* | 11/2018 | Van Rooyen | B25J 11/004 |
| 2019/0184575 A1* | 6/2019 | Zhang | B25J 11/0035 |
| 2019/0248008 A1* | 8/2019 | Noro | G05B 19/416 |
| 2020/0164522 A1* | 5/2020 | Sohn | G11B 27/19 |
| 2021/0248983 A1* | 8/2021 | Balassanian | G05B 15/02 |
| 2021/0339390 A1* | 11/2021 | Gaschler | B25J 9/1664 |
| 2023/0121764 A1* | 4/2023 | Wang | G10H 1/0008 |
| | | | 700/94 |
| 2023/0368757 A1* | 11/2023 | Ito | G10H 1/0091 |
| 2023/0419930 A1* | 12/2023 | Zhang | G10H 1/0025 |
| 2024/0070251 A1* | 2/2024 | Maizels | G10L 13/02 |
| 2024/0181638 A1* | 6/2024 | Sun | B25J 13/003 |
| 2025/0058077 A1* | 2/2025 | Evenstad | G06F 3/165 |

* cited by examiner

FIG. 1

METHOD AND APPARATUS FOR AUTOMATICALLY GENERATING DRUM PLAY MOTION OF ROBOT

CROSS-REFERENCE TO RELATED APPLICATION

This application is based on and claims priority under 35 U.S.C. § 119 to Korean Patent Application No. 10-2023-0085947, filed on Jul. 3, 2023, in the Korean Intellectual Property Office, the disclosure of which is incorporated by reference herein in its entirety.

BACKGROUND

The present disclosure relates to a method and an apparatus for automatically generating a drum play motion of a robot.

The known humanoid robots are not suitable for playing musical instruments, such as drums, because of being designed with a focus on precision and accuracy for object manipulation tasks. There are robots that play drums, but the known drum-playing robots have a problem in that the robots have a bizarre shape with multiple arms or interfere with the audience's immersion in music by modifying musical instruments to fit the robots.

SUMMARY

The present disclosure provides a method and an apparatus for generating a drum play motion of a robot which enable a humanoid robot to do a creative drum play and enable a robot to do a flexible and fast drum play, similar to a human drum play. Technical objects of the present disclosure is not limited to the technical objects described above, and another technical object may be derived from the following description.

According to an aspect of the present disclosure, a method of generating a drum play motion of a robot includes identifying a plurality of parts of a melody based on a change in a pattern of a plurality of notes forming the melody, generating a rhythm of each part of the plurality of identified parts, assigning each of the plurality of notes forming the generated rhythm of each note to one of a right hand and a left hand of the robot, scheduling swing time of each of the right hand and the left hand to which each note of is assigned for each note of the rhythm of each part, generating a trajectory of each of a plurality of joints of the robot for playing the rhythm of each part based on the scheduled swing time of each of the right hand and the left hand, and generating a play motion of the robot by controlling a motion of each of the plurality of joints according to the generated trajectory of each of the plurality of joints.

In the identifying of the plurality of parts, a first beat corresponding to a note at which a first pattern starts among the plurality of notes forming the melody and a part change point corresponding to a boundary where the pattern of the plurality of notes changes may be detected, and the plurality of parts of the melody may be identified according to the detected first beat and the detected part change point.

The identifying of the plurality of parts may include detecting beat per minute (BPM) of the melody, detecting the first beat based on the detected BPM, detecting the part change point based on the detected BPM, and identifying the plurality of parts of the melody according to the detected first beat and the detected part change point.

In the generating of the rhythm of each part, the rhythm of the melody may be generated by inputting each part of the melody to an input layer of an artificial neural network and acquiring the rhythm of each part from an output layer of the artificial neural network.

In the generating of the rhythm of each part, the rhythm and a fill-in of each part for each of the plurality of identified parts may be generated, and, in the generating of each of the plurality of notes, each of the plurality of notes forming the generated rhythm and the generated fill-in of each part may be assigned to one of the right hand and the left hand of the robot.

In the assigning of each of the plurality of notes, each of the plurality of parts forming the rhythm of each part may be assigned to one of the right hand and the left hand according to a play pattern rule that defines a note assignment rule of each of the right hand and the left hand according to the pattern of the plurality of notes.

The method may further include scheduling strike time of each of a plurality of drums according to an interval between notes of the generated rhythm of each part for each of the right hand and the left hand to which each note is assigned, wherein, in the scheduling of the swing time, the swing time of each of the right hand and the left hand to which each note is assigned may be scheduled based on the scheduled strike time of each note.

In the scheduling of the swing time, swing time of each of the right hand and the left hand to which each note is assigned may be scheduled based on the scheduled strike time such that the right hand and the left hand do not collide with each other.

The swing time of each of the right hand and the left hand to which each note is assigned may be scheduled based on the scheduled strike time according to a swing rule that defines time and a height of each swing of the right hand and the left hand according to the pattern of the plurality of notes such that the right hand and the left hand of the robot do not collide with each other.

The method may further include generating a wrist snap trajectory of each of the right and the left hand according to the scheduled swing time of each of the right hand and the left hand, wherein, in the generating of the trajectory of each of the plurality of joints of the robot, the trajectory of each of the plurality of joints of the robot may be generated by converting the generated wrist snap trajectory of each of the right hand and the left hand into a trajectory of each joint of the robot by using a closed-loop inverse kinematic algorithm.

According to another aspect of the present disclosure, a computer-readable recording medium is provided in which a program for causing a computer to perform the method is recorded.

According to another aspect of the present disclosure, an apparatus for generating a drum play motion of a robot includes a part identifier configured to identify a plurality of parts of a melody based on a change in a pattern of a plurality of notes forming the melody, a rhythm generator configured to generate a rhythm of each part of the plurality of identified parts, a note assigner configured to assign each of the plurality of notes forming the generated rhythm of each note to one of a right hand and a left hand of the robot, a time scheduler configured to schedule swing time of each of the right hand and the left hand to which each note of is assigned for each note of the rhythm of each part, a joint trajectory generator configured to generate a trajectory of each of a plurality of joints of the robot for playing the rhythm of each part based on the scheduled swing time of each of the right hand and the left hand, and a play motion generator configured to generate a play motion of the robot by controlling a motion of each of the plurality of joints according to the generated trajectory of each of the plurality of joints.

A plurality of rhythms of a melody may be generated, each of a plurality of notes forming a rhythm of each part may be assigned to one of the right hand and the left hand of the robot, swing time of each of the right hand and the left hand to which each note is assigned may be scheduled, a trajectory of each of a plurality of joints of the robot for playing the rhythm of each part based on the swing time of each of the right hand and the left hand may be generated, and by controlling a motion of each of the plurality of joints according to the trajectory of each of the plurality of joints generated in this way, not only creative drum play of a humanoid robot may be done when only a melody is input but also a robot may do a flexible and fast drum play, similar to a human drum play. Effect of the present disclosure is not limited to the effects described above, and another effect may be derived from the following description.

BRIEF DESCRIPTION OF THE DRAWINGS

Embodiments will be more clearly understood from the following detailed description taken in conjunction with the accompanying drawings in which:

FIG. 1 is a block diagram of an apparatus for generating a drum play motion according to an embodiment of the present disclosure;

DETAILED DESCRIPTION OF THE EMBODIMENTS

Figure 2:
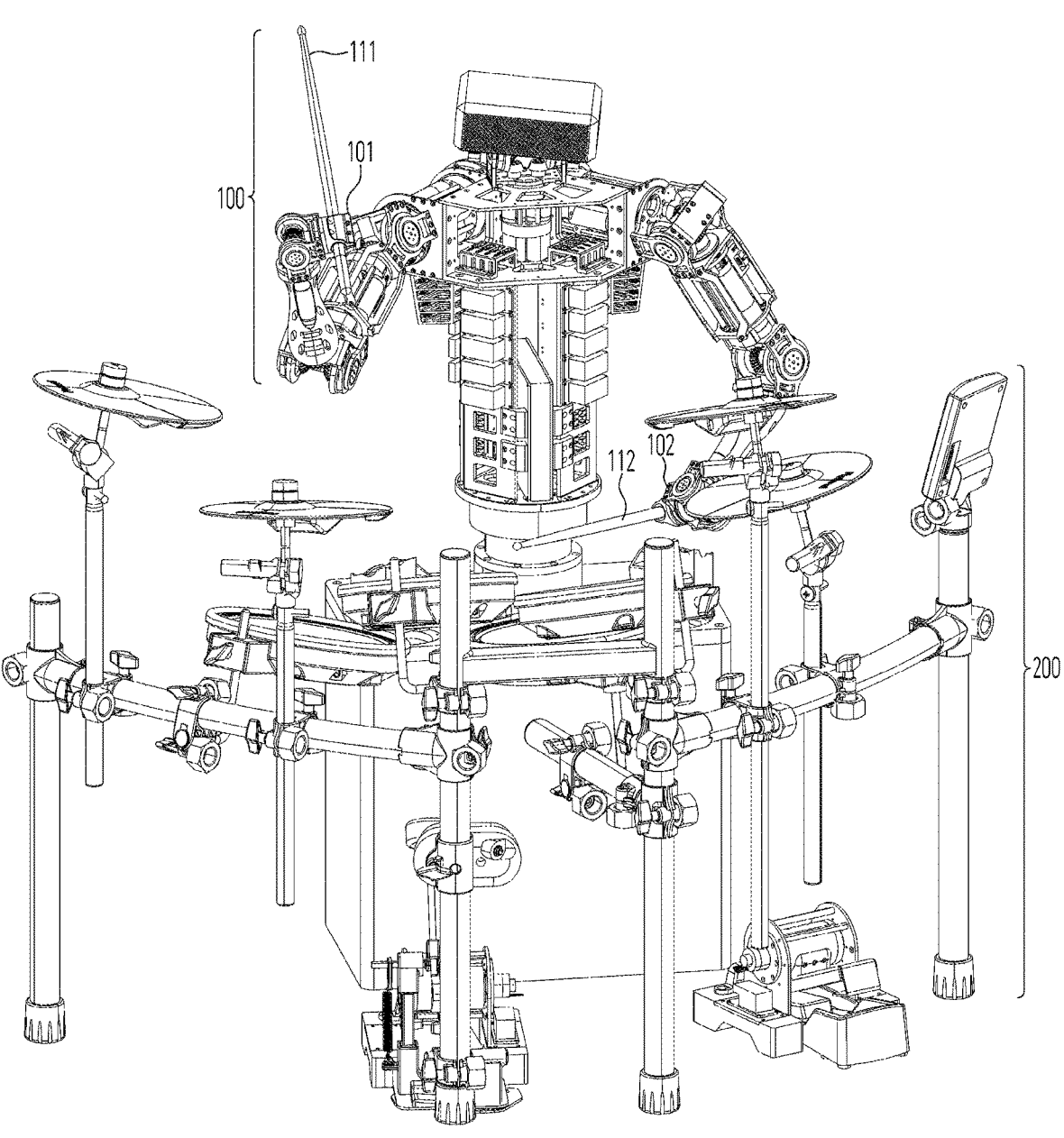
FIG. 2 is an example diagram of a robot driven by the apparatus for generating the drum play motion illustrated in FIG. 1.

Hereinafter, embodiments of the present disclosure will be described in detail with reference to the drawings. Embodiments of the present disclosure to be described below relate to a method and an apparatus for generating a drum play motion of a robot which enable a humanoid robot to do a creative drum play and enable a robot to do a flexible and fast drum play, similar to a human drum play. Hereinafter, the method and apparatus will be briefly referred to as a "drum play motion generating method" and a "drum play motion generating apparatus".

Figure 1:
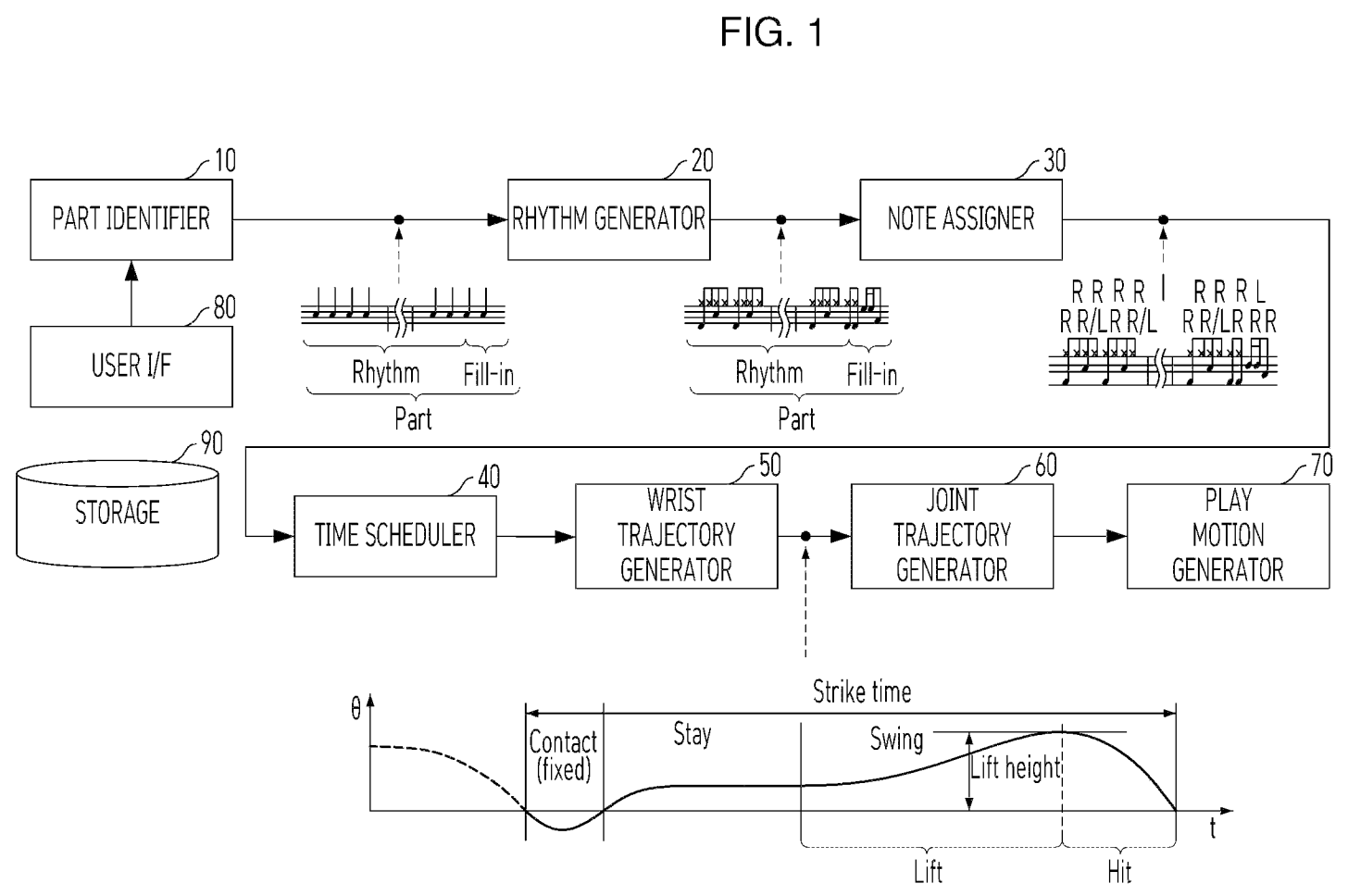

FIG. 1 is a block diagram of a drum play motion generating apparatus according to an embodiment of the present disclosure. Referring to FIG. 1, the drum play motion generating apparatus according to the present embodiment includes a part identifier 10, a rhythm generator 20, a note assigner 30, a time scheduler 40, a wrist trajectory generator 50, a joint trajectory generator 60, a play motion generator 70, a user interface 80, and a storage 90. The user interface 80 serves to receive certain data, for example, a melody, from a user or to display certain data to the user, and may be implemented by a combination of a display panel and a touch screen panel. The storage 90 may store a drum play motion generating algorithm. The other components may be implemented by a field programmable gate array (FPGA) or a processor that executes a drum play motion generation algorithm stored in the storage 90.

FIG. 2 is an example view of a robot driven by the drum play motion generating apparatus illustrated in FIG. 1. As illustrated in FIG. 2, a robot driven by the drum play motion generating apparatus according to the present embodiment is a humanoid robot having a shape and structure similar to a human body, such as head, torso, shoulder, arm, hand, leg, and foot. According to the present embodiment, a drum play is done by striking a plurality of drums 200 by using two sticks 111 and 112 coupled to a right hand 101 and a left hand 102 of a robot 100.

Figure 3:
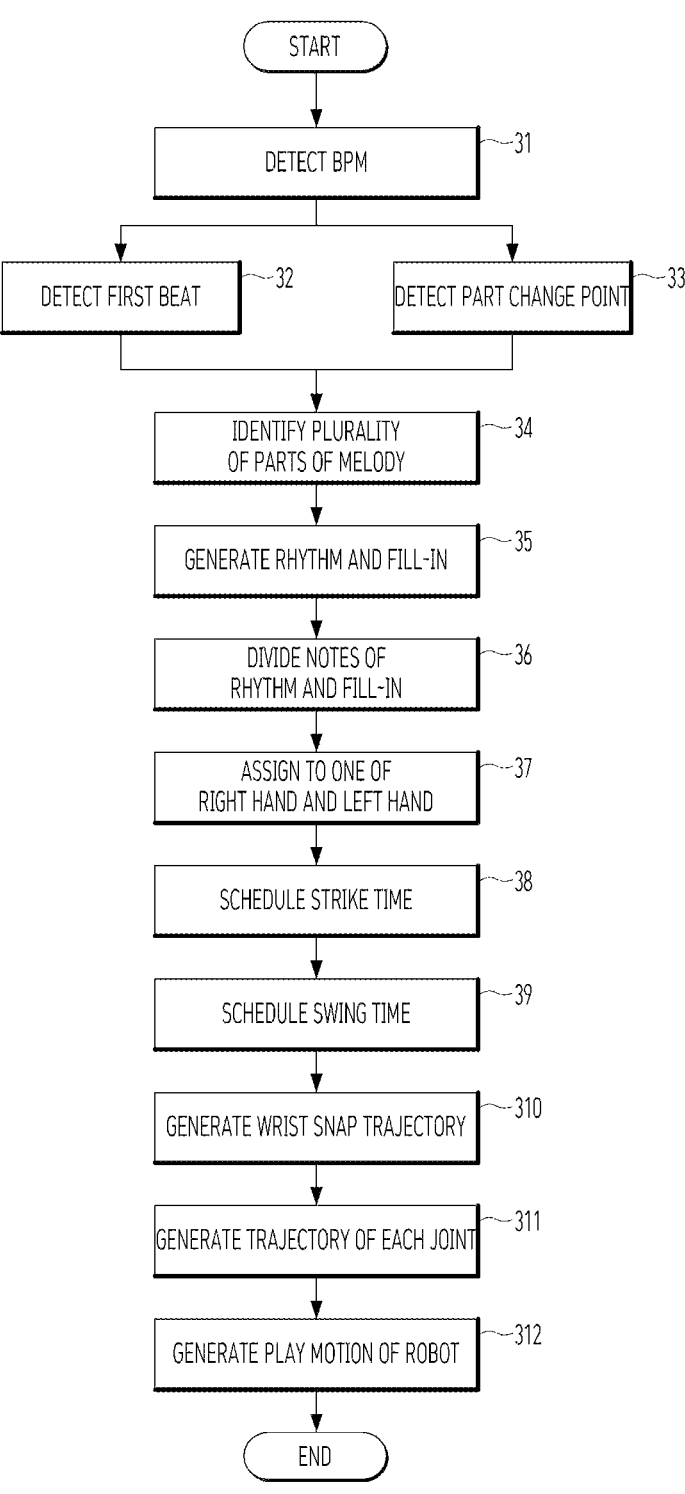
FIG. 3 is a flowchart of a method of generating a drum play motion according to an embodiment of the present disclosure.

FIG. 3 is a flowchart of a drum play motion generating method according to an embodiment of the present disclosure. Referring to FIG. 3, the drum play motion generating method according to the present embodiment includes the following steps performed by the drum play motion generating apparatus illustrated in FIG. 1.

In step 31 to step 34, when a melody is input through the user interface 80, the part identifier 10 identifies a plurality of parts of the melody based on a change in a pattern of a plurality of notes forming the melody input as described above. The melody of the present embodiment is sheet music-type data in which attribute, that is, a height and a length, of each of the plurality of notes forming the melody are represented by a position and a shape of each note, and a representative example thereof is a MIDI file. A melody has a structure in which a plurality of notes are repeated in different patterns. Each part of the melody indicates a section of notes forming one pattern among a plurality of patterns of the plurality of notes forming the melody.

As illustrated in FIG. 1, each part of the melody may be a combination of a rhythm and a fill-in. The rhythm occupies most of each part of the melody and plays a role in enhancing the feeling of each part, and the fill-in follows the rhythm play and plays a role in inducing a natural part change by occupying a quarter of a bar. Some parts of the melody may consist of only rhythms.

In step 31, the part identifier 10 detects beat per minute (BPM) of the melody. In step 32, the part identifier 10 detects a first beat corresponding to a note in which a first pattern of the plurality of notes forming the melody starts, based on the change in the pattern of the plurality of notes forming the melody based on the BPM detected in step 31. In step 33, the part identifier 10 detects a part change point corresponding to a boundary where a pattern of the plurality of notes forming the melody changes based on the change in the pattern of the plurality of notes forming the melody based on the BPM detected in step 31. In step 34, the part identifier 10 identifies a plurality of parts of the melody according to the first beat detected in step 32 and the part change point in step 33.

In step 35, the rhythm generator 20 generates a rhythm and a fill-in of each part for each of the plurality of parts identified by the part identifier 10. As illustrated in FIG. 1, the rhythm and fill-in generated by the rhythm generator 20 are sheet music-type data that represents attribute of each of the plurality of notes forming the rhythm and fill-in as a position and shape of each note. The rhythm generator 20 generates rhythm and fill-in of each part of the melody for each part of the melody by using a rhythm database in which many rhythms suitable for various melody patterns are recorded and a fill-in database in which many fill-ins suitable for various melody patterns are recorded. A large database for rhythms and fill-ins may be built from many songs of various genres. The rhythm generator 20 may also generate only a rhythm for a certain part among the plurality of parts identified by the part identifier 10 according to characteristics of the part.

Figure 4:
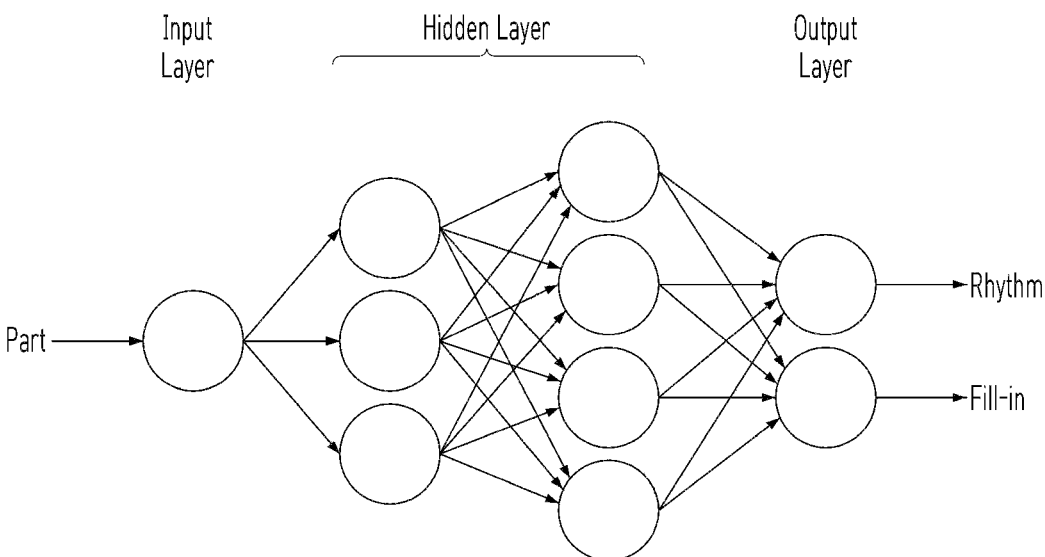
FIG. 4 is an example diagram of an artificial neural network used for generation of a rhythm and a fill-in in step 35 illustrated in FIG. 3.

FIG. 4 is an example diagram of an artificial neural network used for generation of rhythms and fill-ins in step 35 illustrated in FIG. 3. A hidden layer of the artificial neural network illustrated in FIG. 4 is actually composed of many neurons. The rhythm generator 20 generates rhythms and fill-ins of a melody by using a method of acquiring a rhythm and a fill-in for each part of the melody from an output layer of the artificial neural network by inputting each part of the melody identified by the part identifier 10 to an input layer of the artificial neural network. Learning of the artificial neural network is performed by using a rhythm database and a fill-in database. That is, while repeating inputs of various types of melody parts to the input layer of the artificial neural network, the learning of the artificial neural network is performed by using a method of repeatedly adjusting weighted values of a hidden layer of an artificial neural network such that rhythms and fill-ins suitable for each melody part are output from the output layer of the artificial neural network whenever each melody part is input. Such an artificial neural network may be implemented by a FPGA or implemented by a computer program to be stored in the storage 90.

In step 36, the note assigner 30 divides notes of the rhythm and fill-in generated by the rhythm generator 20 in step 35. In step 37, the note assigner 30 assigns each of the plurality of notes forming the rhythm and fill-in of each part generated by the rhythm generator 20 in step 35 according to a play pattern rule that defines a note assignment rule of each of a right hand 101 and a left hand 102 according to a plurality of note patterns, that is, each note divided in step 36, to either the right hand 101 or the left hand 102 of the robot 100. The play pattern rule is set such that a drum corresponding to each note divided in step 36 among the plurality of drums is assigned to a closer hand among the right hand 101 and the left hand 102 and is assigned to the hand to which the previous note of each note is not assigned among the right hand 101 and left hand 102, and each note divided in step 36 according to the plurality of note patterns is assigned to either the right hand 101 or the left hand 102 based on conditions in which collision between the right hand 101 and the left hand 102 does not occur.

Figure 5:
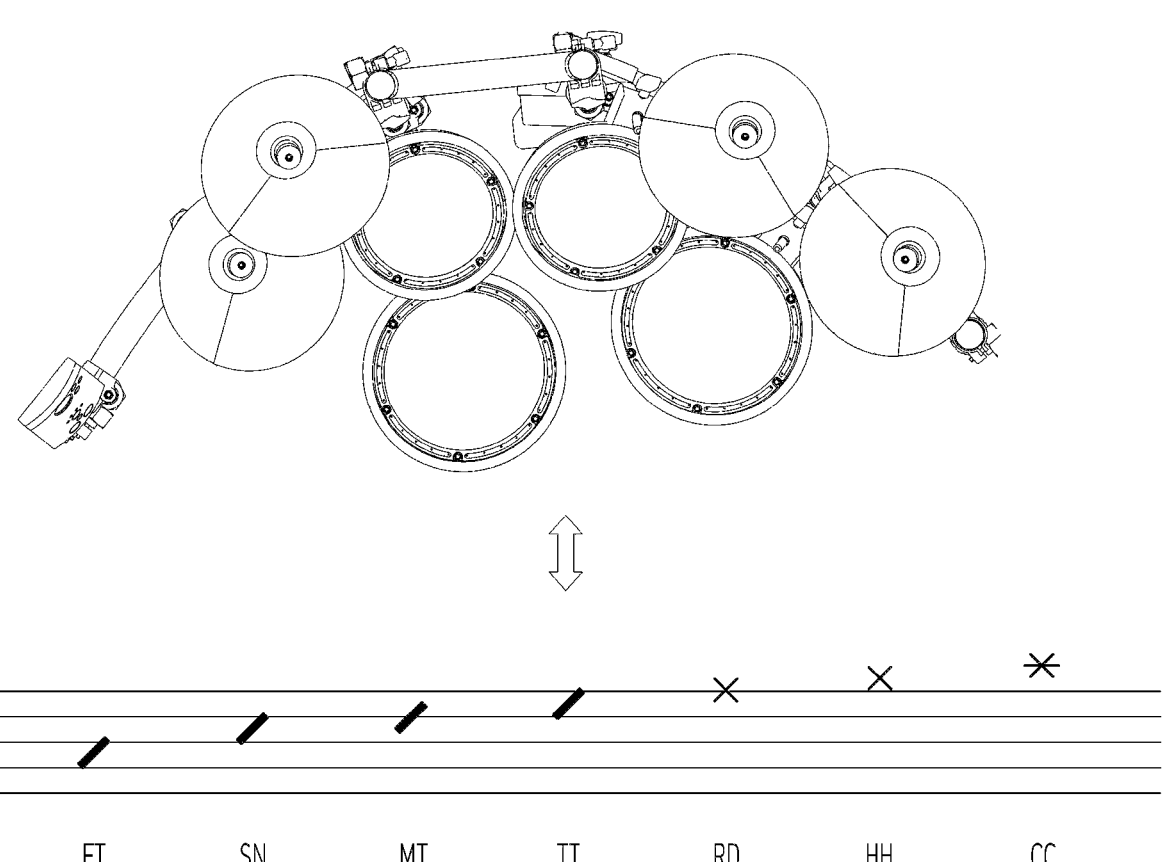
FIG. 5 illustrates an example of a corresponding relationship between a plurality of notes and a plurality of drums.

FIG. 5 illustrates an example of a corresponding relationship between a plurality of notes and a plurality of drums. Referring to FIG. 5, a plurality of drums are composed of a snare SN, a top tom TT, a mid tom MT, a floor tom FT, a crash symbol CC, a ride symbol RD, and a hi-hat HH. Each note corresponds to one of the plurality of drums according to attribute thereof, that is, a height and a length, and a drum corresponding thereto is struck for each note. For example, the lowest note among the notes illustrated in FIG. 5 corresponds to the floor tom FT, and the floor tom FT is struck for the note.

In step 38, the time scheduler 40 schedules strike time of each of the right hand 101 and the left hand 102 to which each note is assigned by the note assigner 30 in step 37 according to an interval between notes of the rhythm of each part generated by the rhythm generator 20 in step 35 for each note of the rhythm of each part generated by the rhythm generator 20 in step 35. Here, the strike time indicates the time during which one of the right hand 101 and the left hand 102 may strike a next drum after striking a certain drum and is determined according to an interval between notes of the rhythm and fill-in.

In step 39, the time scheduler 40 schedules swing time of each of the right hand 101 and the left hand 102 to which each note is assigned by the note assigner 30 in step 37 for each note of the rhythm and fill-in of each part generated by the rhythm generator 20 in step 35 such that the right hand 101 and the left hand 102 of the robot 100 do not collide with each other based on the strike time of each of the right hand 101 and the left hand 102 scheduled in step 38. The time scheduler 40 schedules swing time of each of the right hand 101 and the left hand 102 to which each note is assigned by the note assigner 30 in step 37 for each note of the rhythm and fill-in of each part generated by the rhythm generator 20 in step 35 based on the strike time of each of the right hand 101 and the left hand 102 scheduled in step 38 according to the swing rule that defines time and a height of each of swing of each of the right hand 101 and the left hand 102 of the robot 100 according to a plurality of note patterns such that the right hand 101 and the left hand 102 of the robot 100 do not collide with each other.

The maximum swing time of each of the right hand 101 and the left hand 102 may not exceed an one-beat interval of the BPM of the melody detected in step 31, for example, a quarter note, and when the strike time of each of the right hand 101 and the left hand 102 scheduled in step 38 is less than the one-beat interval, a basic rule of swing is set such that the swing time of each of the right hand 101 and the left hand 102 is the same as the strike time. A play pattern in which a collision between the right hand 101 and the left hand 102 is expected is selected based on the right hand 101 assigned to the note corresponding to the hi-hat HH and the left hand 102 assigned to the note corresponding to the snare SN, and a detailed rule for each play pattern is established.

Figure 6:
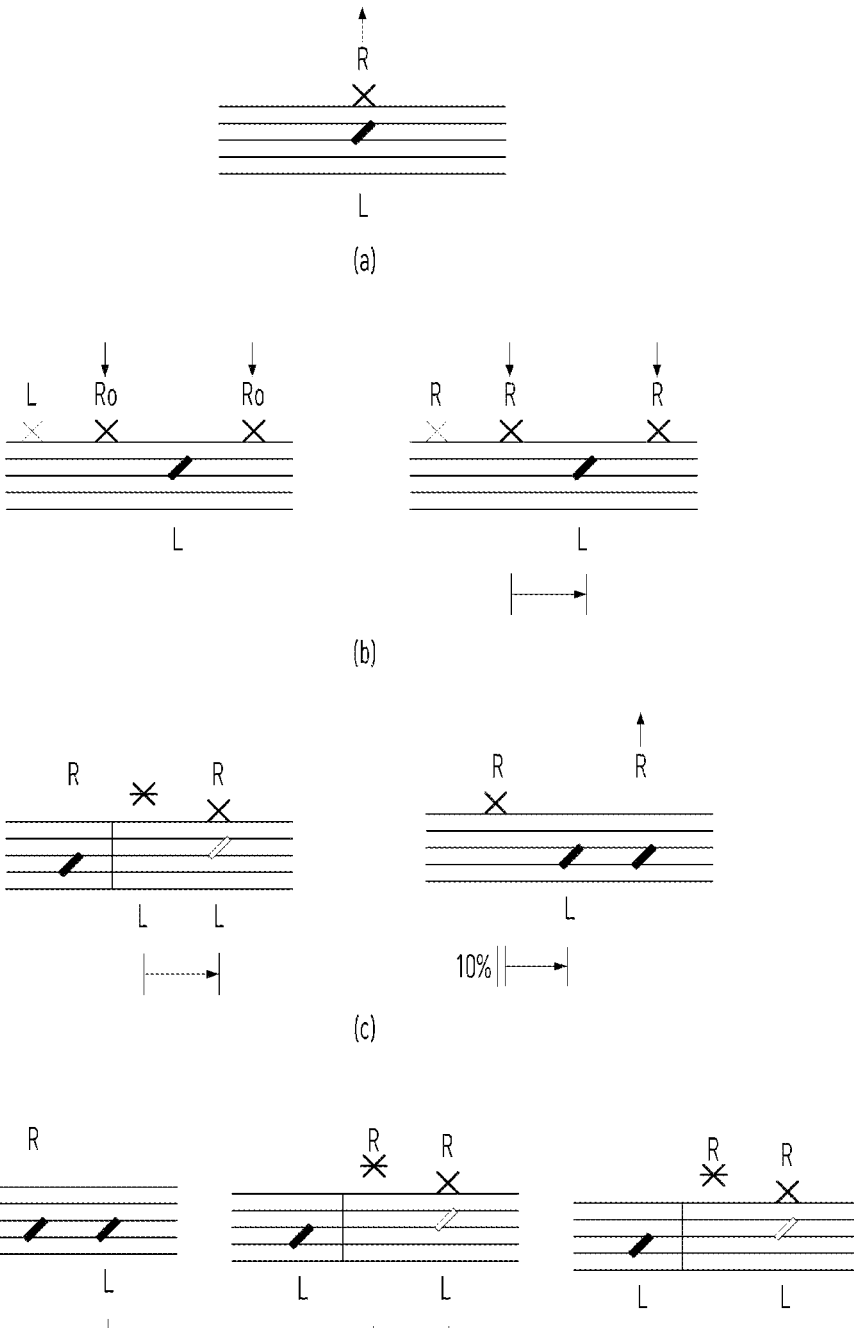
FIG. 6, including parts (a)-(f), illustrates examples of a play pattern rule and a swing rule for the example illustrated in FIG. 5.

FIG. 6, parts (a) to (f) are diagrams illustrating examples of a play pattern rule and a swing rule for the example illustrated in FIG. 5. FIG. 6, part (a) illustrates a play pattern rule for a note pattern at which strike points in time of two notes are the same as each other. In this case, the play pattern rule is set such that the hand closest to the drum corresponding to a strike target of each note among the right hand 101 and the left hand 102 is assigned to each note. According to the example of FIG. 6, part (a), the hi-hat HH is assigned to the right hand 101, and the snare SN is assigned to the left hand 102, and accordingly, the hi-hat HH and the snare SN are struck simultaneously. Here, the assignment of the hi-hat HH to the right hand 101 means that a note corresponding to the hi-hat HH is assigned to the right hand 101, and the assignment of the snare SN to the left hand 102 means that a note corresponding to the snare SN is assigned to the left hand 102. In the following, expressions are made briefly as described above.

In this case, swing of each of the right hand 101 and the left hand 102 is largely to give dynamics and a sense of rhythm when striking, and a swing rule is set such that a swing height of the right hand 101 is higher than a reference height to prevent a collision between the right hand 101 and the left hand 102. An arrow illustrated in FIG. 6, part (a) indicates that the swing height of the right hand 101 is set higher than the reference height. The swing of each of the right hand 101 and the left hand 102 is performed at a preset reference height unless otherwise specified in the swing rule for a certain note pattern. When the swing height of each of the right hand 101 and the left hand 102 is higher or lower than the reference height, a difference from the reference height is set in the swing rule.

FIG. 6, parts (b) and (c) illustrate play pattern rules in which three notes are assigned in the order of the right hand 101, the left hand 102, and the right hand 101 according to a pattern of the three notes. FIG. 6, part (b) illustrates a play pattern rule in which the hi-hat HH is assigned to the right hand 101, the snare SN is assigned to the left hand 102, and the hi-hat HH is assigned to the right hand 101 according to the pattern of the three notes. The left side of FIG. 6. part (b) illustrates a case where the hi-hat HH assigned to the left hand 102 exists before the first hi-hat HH. In this case, the swing rule is set to give an offset Ro to a strike point for the hi-hat HH assigned to the right hand 101 based on the snare SN in order to prevent a collision that may occur when the left hand 102 strikes the snare SN.

A drum strike point of each of the right hand 101 and left hand 102 becomes the center of each drum unless otherwise specified in the swing rule for a certain note pattern. When the drum strike point of each of the right hand 101 and the left hand 102 deviate from the center, an offset corresponding to the difference from the center is set in the swing rule. The right side of FIG. 6, part (b) illustrates a case where the hi-hat HH assigned to the left hand 102 does not exist before the first hi-hat HH, for example, a case where the right hand 101 is assigned to the hi-hat HH. In this case, the swing of the left hand 102 assigned to the snare SN starts after the swing of the right hand 101 to the hi-hat HH.

The left side of FIG. 6, part (c) illustrates a play pattern rule in which the floor tom FT is assigned to the right hand 101, the crash symbol CCI is assigned to the left hand 102, and the hi-hat HH is assigned to the right hand 101 according to the pattern of three notes. In this case, the swing rule is set such that the left hand 102 moves to the snare SN after striking the crash symbol CCI so as not to interfere with the swing of the right hand 101 assigned to the hi-hat HH without strike after the virtual snare SN is placed at a position of the hi-hat HH.

The right side of FIG. 6, part (c) illustrates a play pattern rule in which the hi-hat HH is assigned to the right hand 101, the floor tom FT is assigned to the left hand 102, and the floor tom FT is assigned to the right hand 101 according to the pattern of three notes. In this case, the swing rule is set such that the right hand 101 swings high because the right hand 101 assigned to the hi-hat HH may collide with the left hand 102 assigned to the floor tom FT when moving to strike the floor tom FT and the left hand 102 starts swing after resting 10% of the total strike time without starting swing immediately after the right hand 101 strikes the hi-hat HH.

In this way, when the left hand 102 and the right hand 101 are consecutively assigned to a tom, the type of the second tom is limited according to the type of the first tom. Since the first tom is assigned to the left hand 102 and the second tom is assigned to the right hand 101, when the left hand 102 strikes the tom located on the right for the drum set illustrated in FIG. 5, the toms that may be struck by the right hand 101 are limited to the tom struck by the left hand and toms on the far right. For example, when the left hand strikes the mid tom MT, the toms that may be struck by the right hand 101 are limited to the mid tom MT and the floor tom FT.

FIG. 6, part (d) illustrates a play pattern rule in which three notes are assigned in the order of the right hand 101, the right hand 101, and the left hand 102 according to a pattern of the three notes. According to the pattern of three notes, the hi-hat HH is assigned to the right hand 101, the floor tom FT is assigned to the right hand 101, and the floor tom FT is assigned to the left hand 102. As in the right example of FIG. 6, part (c), the type of the second tom is limited according to the type of the first tom. Since the first tom is assigned to the right hand 101 and the second tom is assigned to the left hand 102, toms that may be struck by the left hand 102 according to the tom struck by the right hand 101 is limited to the tom struck by the right hand 101 and the toms located to the left for the drum set illustrated in FIG. 6, parts (a) to (f). For example, when the right hand 101 strikes the mid tom MT, the toms that may be struck by the left hand are limited to the mid tom MT, the snare SN, and the top tom TT.

When the right hand 101 moves from the hi-hat HH to the tom, the left hand 102 start the swing after resting 10% of the total strike time without starting the swing immediately after the right hand 101 strikes the hi-hat HH. The same swing rule is applied even when the crash symbol CCI is assigned to the right hand 101 instead of the hi-hat HH. Table 1 illustrates the type of drums that may be struck by the right hand 101 or the left hand 102 according to the type of drum to be struck by the right hand 101 or the left hand 102. In Table 1, "o" represents the type of drum that may be struck.

TABLE 1

| R | L | | | |
| --- | --- | --- | --- | --- |
| | SN | TT | MT | FT |
| SN | O | O | | |
| TT | O | O | | |
| MT | O | O | O | |
| FT | O | O | O | O |

FIG. 6, part (e) illustrates a play pattern rule in which three notes are assigned in the order of the left hand 102, the right hand 101, and the right hand 101 according to a pattern of the three notes. According to the pattern of the three notes, the floor tom FT is assigned to the right hand 101, the crash symbol CC is assigned to the right hand 101, and the hi-hat HH is assigned to the left hand 102. Here, the floor tom FT may be the top tom TT or the mid tom MT. As in the left swing rule of FIG. 6, part (c), a swing rule is set such that the left hand 102 strikes the tom and then moves to the snare SN after waiting until the right hand 101 strikes the crash symbol CC so as not to interfere with the swing of the right hand 101 assigned to the hi-hat HH without strike after the virtual snare SN is placed at a position of the hi-hat HH.

FIG. 6, part (f) illustrates a play pattern rule in which three notes are assigned in the order of the right hand 101, the right hand 101, and the right hand 101 according to a pattern of the three notes. The floor tom FT is assigned to the right hand 101, the crash symbol CC is assigned to the right hand 101, and the hi-hat HH is assigned to the right hand 101 according to the pattern of the three notes. Here, the floor tom FT may be the top tom TT or the mid tom MT. As in the left swing rule of FIG. 6, part (c), the swing rule is set such that the left hand 102 moves to the snare SN after waiting until the right hand 101 strikes the crash symbol CC so as not to interfere with the swing of the right hand 101 assigned to the hi-hat HH without strike after the virtual snare SN is placed at a position of the hi-hat HH. A robot may do a flexible and fast drum play in the same manner as a human drum play by the human according to the play pattern rules and the swing rules described above.

In step 310, the wrist trajectory generator 50 generates wrist snap trajectories of the right hand 101 and the left hand 102 according to swing time of each of the right hand 101 and the left hand 102 scheduled by the time scheduler 40 in step 39. The wrist trajectory generator 50 generates the wrist snap trajectories of the right hand 101 and the left hand 102 which are represented as three-dimensional position values x, y, and z and rotation values phi and theta in a work space according to the swing time of each of the right hand 101 and the left hand 102 scheduled by the time scheduler 40 in step 39 by using a wrist snap trajectory generation algorithm. FIG. 1 illustrates an example of a wrist position and a wrist snap trajectory for "theta" during rotation.

Figure 7:
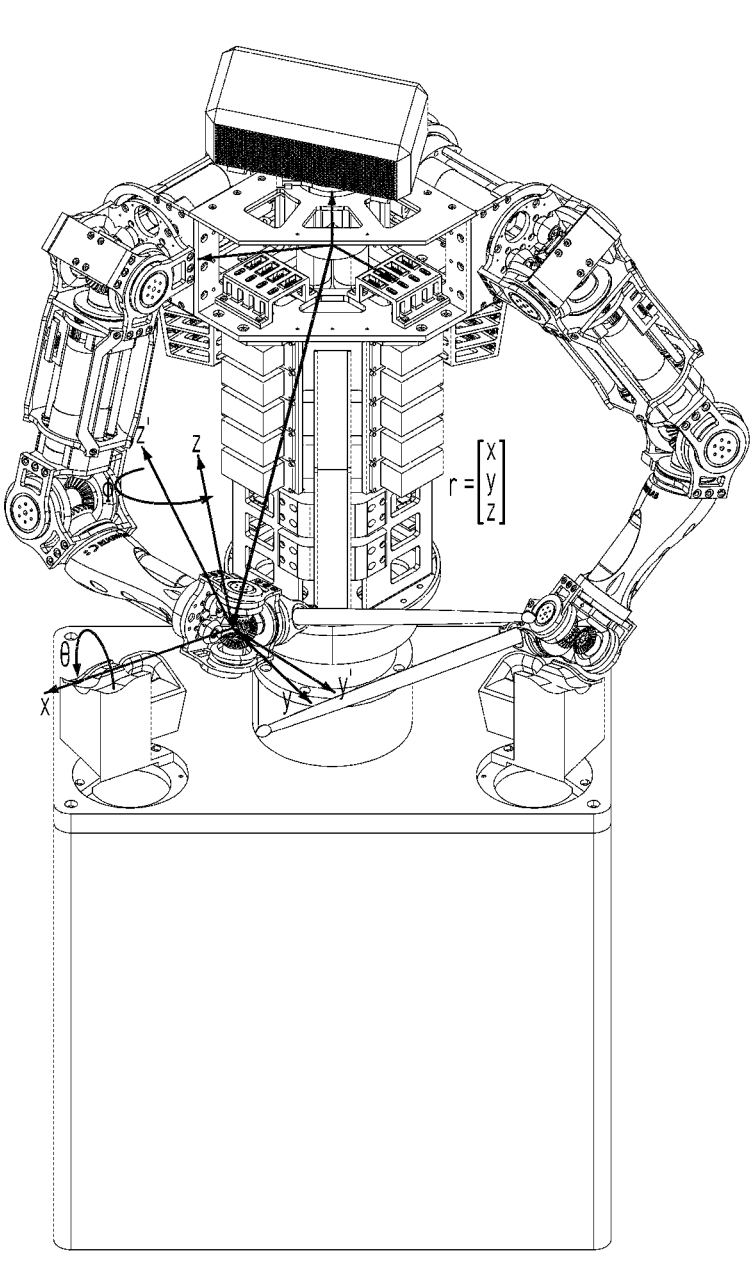
FIG. 7 is a view illustrating a coordinate system of a wrist snap trajectory in step 310 of FIG. 3.

FIG. 7 is a view illustrating a coordinate system of the wrist snap trajectory in step 310 of FIG. 3. Among two coordinate points illustrated in FIG. 7, an upper coordinate point corresponds to an original point. Referring to FIG. 7, the wrist snap trajectory generation algorithm synthesizes a movement trajectory "r" and an up-down motion trajectory by using a trajectory "r" in which positions and rotation x, y, z, phi, and theta of wrists of the right hand 101 and left hand 102 mapped to each of a plurality of swing times of the right hand 101 and the left hand 102 during the swing time from the previous point to the next point are moved from the previous point to the next point and an up-down motion trajectory for the wrist positions and "z" and "theta" during rotation to represent the wrist snap. A combination of the movement trajectory "r" of each of the right hand 101 and the left hand 102 and the up-down motion trajectory is the wrist snap trajectory of each of the right hand 101 and the left hand 102.

In step 311, the joint trajectory generator 60 generates a trajectory of each of a plurality of joints of the robot 100 for playing the rhythm and fill-in of each part generated by the rhythm generator 20 in step 35 based on the swing time of each of the right hand 101 and the left hand 102 scheduled by the time scheduler 40 in step 39. The joint trajectory generator 60 generates the trajectory of each of the plurality of joints of the robot 100 by converting the wrist snap trajectory of each of the right hand 101 and the left hand 102 generated by the wrist trajectory generator 50 in step 310 to a trajectory for each joint of the robot 100 by using a closed-loop inverse kinematic algorithm.

Figure 8:
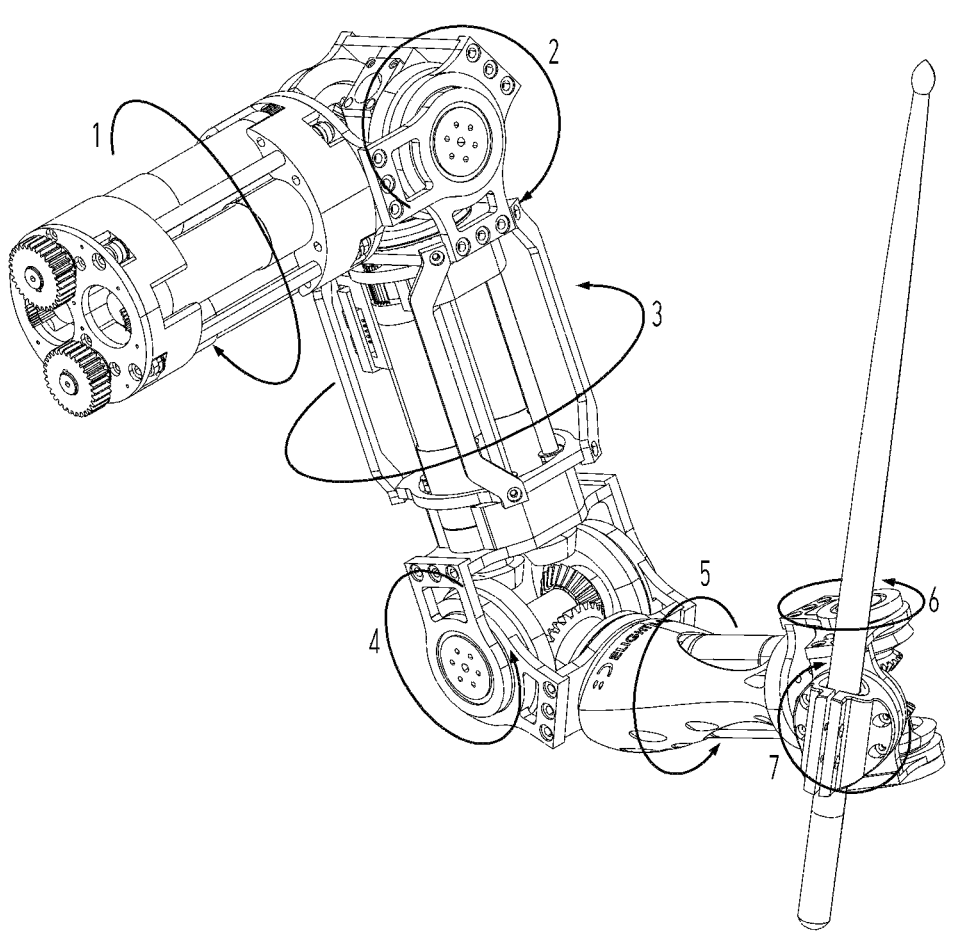
FIG. 8 is an example view illustrating rotation of seven joints of the robot illustrated in FIG. 2.

The joint trajectory generator 60 converts three-dimensional position values and rotation values x, y, z, phi, and theta in a work space corresponding to the wrist snap trajectory of each of the right hand 101 and the left hand 102 generated by the wrist trajectory generator 50 by using the closed loop inverse kinematic algorithm into seven joint angle values q1, q2, . . . , q7 in a joint space by using the closed-loop inverse kinematic algorithm. FIG. 8 is an example view illustrating rotation of seven joints of the robot 100 illustrated in FIG. 2. Each of the seven joint angle values in the joint space represents a rotational position of each joint illustrated in FIG. 8.

In step 312, the play motion generator 70 generates a play motion of the robot 100 by controlling a motion of each of the plurality of joints of the robot 100 according to the trajectory of each of the plurality of joints generated by the joint trajectory generator 60 in step 311. The play motion generator 70 generates a play motion of the robot 100 by controlling a rotational motion of each joint illustrated in FIG. 8 according to the joint angle values corresponding to a trajectory of each of the plurality of joints generated by the joint trajectory generator 60 in step 311.

Meanwhile, the drum play motion generating method according to the embodiment of the present disclosure described above may be implemented by a program executable on a processor of a computer and may be implemented on a computer that records and executes the program on a computer-readable recording medium. The computer includes all types of computers that may execute programs, such as a desktop computer, a notebook computer, a smartphone, and an embedded-type computer. In addition, a structure of the data used in one embodiment of the present disclosure described above may be recorded on a computer-readable recording medium through various means. The computer-readable recording medium includes a storage, such as random access memory (RAM), read only memory (ROM), a magnetic storage medium (for example, a floppy disk, a hard disk, or so on), or an optical reading medium (for example, compact disk (CD)-ROM, a digital video disk (DVD), or so on).

Herein, preferred embodiments of the present disclosure are described. Those skilled in the art to which the present disclosure belongs will be able to understand that the present disclosure may be implemented in a modified form without departing from the essential characteristics of the present disclosure. Therefore, the disclosed embodiments should be considered from an illustrative point of view rather than a restrictive point of view. The scope of the present disclosure is represented in the claims rather than the above description, and all differences within the equivalent scope will be construed as being included in the present disclosure.

What is claimed is:

1. A method of generating movement of a robot, the method comprising:

identifying a plurality of parts of a melody formed by a plurality of notes, based on a change in a pattern of the plurality of notes as the melody is played;

generating a rhythm for each of the identified parts of the melody;

assigning each of the plurality of notes that form the generated rhythm to one of a right hand and a left hand of the robot;

scheduling swing time of each of the right hand and the left hand;

generating a trajectory for each of a plurality of joints of the robot that respectively controls movement of the right hand and the left hand of the robot for playing the rhythm of each of the parts based on the scheduled swing time of each of the right hand and the left hand;

generating a play motion of the robot by controlling a motion of each of the plurality of joints according to the generated trajectory for each of the plurality of joints; and scheduling strike time of each of a plurality of drums according to an interval between notes of the generated rhythm of the each part for each of the right hand and the left hand to which the each note is assigned, wherein, in the scheduling of the swing time, the swing time of each of the right hand and the left hand to which the each note is assigned is scheduled based on the scheduled strike time of the each note, wherein, in the scheduling of the swing time, the swing time of each of the right hand and the left hand to which the each note is assigned is scheduled based on the scheduled strike time such that the right hand and the left hand do not collide with each other, and wherein the swing time for each of the right hand and the left hand to which the each note is assigned is scheduled based on the scheduled strike time according to a swing rule that defines time and a height of each swing of the right hand and the left hand according to the pattern of the plurality of notes such that the right hand and the left hand of the robot do not collide with each other.

2. The method of claim 1, wherein, in the identifying of the plurality of parts, a first beat corresponding to a note at which a first pattern starts among the plurality of notes forming the melody and a part change point corresponding to a boundary where the pattern of the plurality of notes changes are detected, and the plurality of parts of the melody are identified according to the detected first beat and the detected part change point.

3. The method of claim 2, wherein the identifying of the plurality of parts comprises:

detecting beat per minute (BPM) of the melody;

detecting the first beat based on the detected BPM;

detecting the part change point based on the detected BPM; and identifying the plurality of parts of the melody according to the detected first beat and the detected part change point.

4. The method of claim 1, wherein, in the generating of the rhythm of the each part, the rhythm of the melody is generated by inputting each part of the melody to an input layer of an artificial neural network and acquiring the rhythm of the each part from an output layer of the artificial neural network.

5. The method of claim 1, wherein, in the generating of the rhythm of the each part, the rhythm and a fill-in of the each part for each of the plurality of identified parts are generated, and, wherein in the generating of each of the plurality of notes, each of the plurality of notes forming the generated rhythm and the generated fill-in of the each part is assigned to one of the right hand and the left hand of the robot.

6. The method of claim 1, wherein, in the assigning of each of the plurality of notes, each of the plurality of parts forming the rhythm of the each part is assigned to one of the right hand and the left hand according to a play pattern rule that defines a note assignment rule of each of the right hand and the left hand according to the pattern of the plurality of notes.

7. The method of claim 1, further comprising:

generating a wrist snap trajectory of each of the right and the left hand according to the scheduled swing time of each of the right hand and the left hand, wherein, in the generating of the trajectory of each of the plurality of joints of the robot, the trajectory of each of the plurality of joints of the robot is generated by converting the generated wrist snap trajectory of each of the right hand and the left hand into a trajectory of each joint of the robot by using a closed-loop inverse kinematic algorithm.

8. A computer program product comprising a non-transitory computer-readable recording medium having recorded thereon at least one program comprising commands, which when executed by a computer, performs the method of claim 1.

9. An apparatus for generating movement of a robot, the apparatus comprising:

a processor including a part identifier configured to identify a plurality of parts of a melody formed by a plurality of notes, based on a change in a pattern of the plurality of notes as the melody is played;

a rhythm generator configured to generate a rhythm for each of the identified parts of the melody;

a note assigner configured to assign each of the plurality of notes that form the generated rhythm to one of a right hand and a left hand of the robot;

a time scheduler configured to:

schedule swing time of each of the right hand and the left hand; and schedule strike time of each of a plurality of drums according to an interval between notes of the generated rhythm of the each part for each of the right hand and the left hand to which the each note is assigned;

a joint trajectory generator configured to generate a trajectory for each of a plurality of joints of the robot that respectively controls movement of the right hand and the left hand of the robot for playing the rhythm of each of the part based on the scheduled swing time of each of the right hand and the left hand; and a play motion generator configured to generate a play motion of the robot by controlling a motion of each of the plurality of joints according to the generated trajectory for each of the plurality of joints, wherein, the swing time of each of the right hand and the left hand to which the each note is assigned is scheduled based on the scheduled strike time of the each note, wherein, the swing time of each of the right hand and the left hand to which the each note is assigned is scheduled based on the scheduled strike time such that the right hand and the left hand do not collide with each other, and wherein the swing time for each of the right hand and the left hand to which the each note is assigned is scheduled based on the scheduled strike time according to a swing rule that defines time and a height of each swing of the right hand and the left hand according to the pattern of the plurality of notes such that the right hand and the left hand of the robot do not collide with each other.

* * * * *